Sept. 20, 1971     L. I. LISTON     3,606,247

LEVELER FOR TRAILERS

Filed Aug. 25, 1969     2 Sheets-Sheet 1

INVENTOR.
LAWRENCE I. LISTON
BY Lyon & Lyon
ATTORNEYS

Sept. 20, 1971 L. I. LISTON 3,606,247
LEVELER FOR TRAILERS
Filed Aug. 25, 1969 2 Sheets-Sheet 2

INVENTOR.
LAWRENCE I. LISTON
BY
Lyon+Lyon
ATTORNEYS

United States Patent Office 3,606,247
Patented Sept. 20, 1971

3,606,247
LEVELER FOR TRAILERS
Lawrence I. Liston, 4107 W. 176th St.,
Torrance, Calif. 90504
Filed Aug. 25, 1969, Ser. No. 852,768
Int. Cl. B60s 9/02
U.S. Cl. 254—86H
4 Claims

ABSTRACT OF THE DISCLOSURE

A leveler for trailers wherein four simultaneously operated pumps of equal capacity supply hydraulic fluid to four hydraulic leveling jacks mounted at the corners of the trailer. Hydraulic fluid is supplied to the pumps from a common reservoir through a level sensor mounted on the trailer in such a manner that when the sensor is level, the trailer is likewise level, the sensor having a central downwardly directed inlet and four upwardly open outlets spaced radially from the inlet in correspondence with the jacks, the inlet and the four outlets defining a common plane so that hydraulic fluid is supplied to the lower inlet or inlets and corresponding jacks when the level sensor is tilted, thereby causing the level sensor to seek a level condition.

BACKGROUND OF THE INVENTION

Leveling devices for trailers, vehicles or stationary apparatus have usually involved jacks located at the corners of the apparatus to be leveled. The jacks may be individually operated, or may be interconnected so that leveling of the apparatus may be accomplished automatically; however, such automatic levelers have heretofore been quite complicated.

SUMMARY OF THE INVENTION

The present invention is a leveler particularly suited for trailers, but is equally applicable to other vehicles or stationary apparatus and is summarized in the following objects:

First, to provide a leveler which is particularly simple and inexpensive to manufacture, and is easily operated even by an unskilled person.

Second, to provide a leveler which incorporates a novel and inexpensive level sensor mounted on the trailer or the like in such a manner that the level condition of the sensor corresponds to the level condition of the trailer, the level sensor being capable of controlling flow of hydraulic fluid to the jacks in such a manner that the lower jack receives the principal supply of hydraulic fluid; then, as the trailer becomes level, all jacks operate, if desired, to continue to raise the trailer in its level state.

Third, to provide a leveler, as indicated in the preceding objects, wherein the level sensor utilizes a chamber having an inlet port and radially spaced outlet ports which occupy a common plane, so that when the level sensor is tilted the lower outlets receive hydraulic fluid to cause the level sensor to seek a level position.

Figure 1:
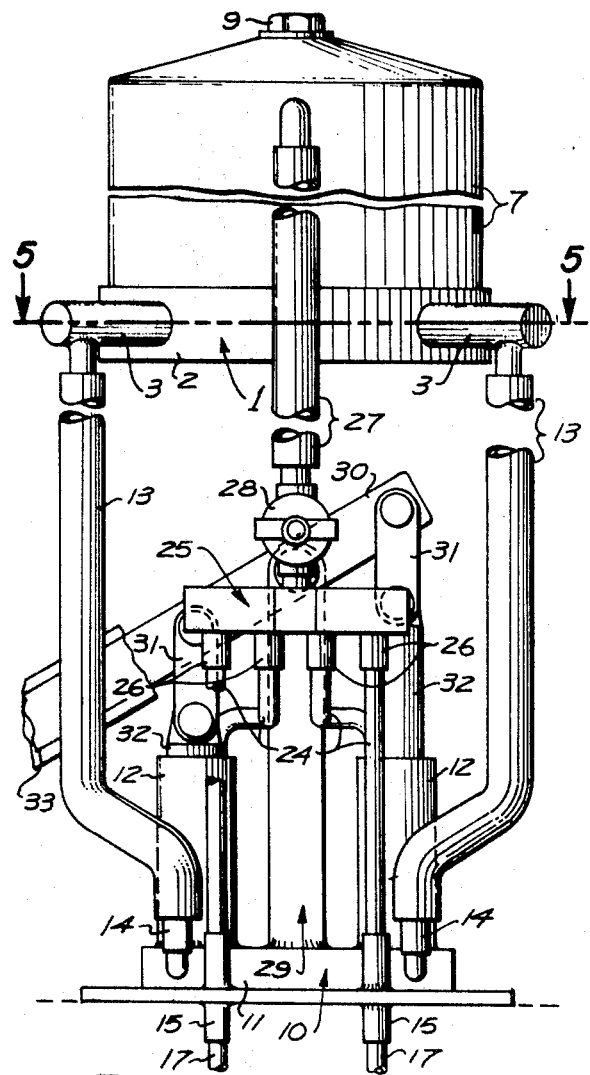
FIG. 1 is a side view of the leveler for trailers, the leveler sensing unit and reservoir being shown separated from the pumping unit, and showing one pair of pumps in their contracted position, the other pair in their extended position.
Figure 2:
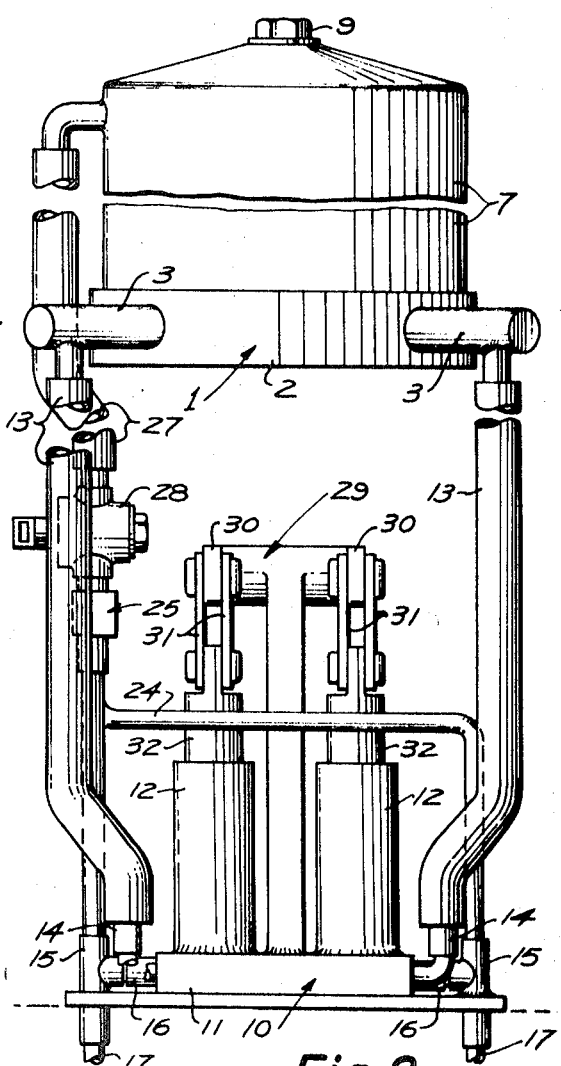
FIG. 2 is a similar view, taken at right angles to FIG. 1, the pumps being shown in their mid-position.
Figure 3:
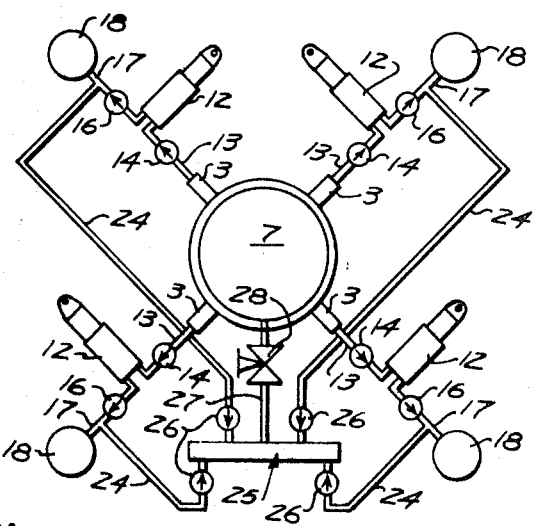
FIG. 3 is a diagrammatical view, showing the hydraulic system.
Figure 4:
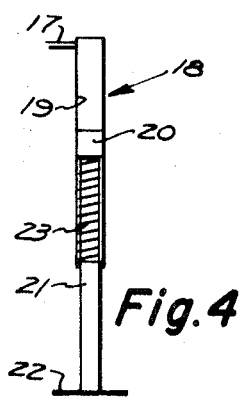
FIG. 4 is a diagrammatical view of one of the hydraulic jacks.
Figure 5:
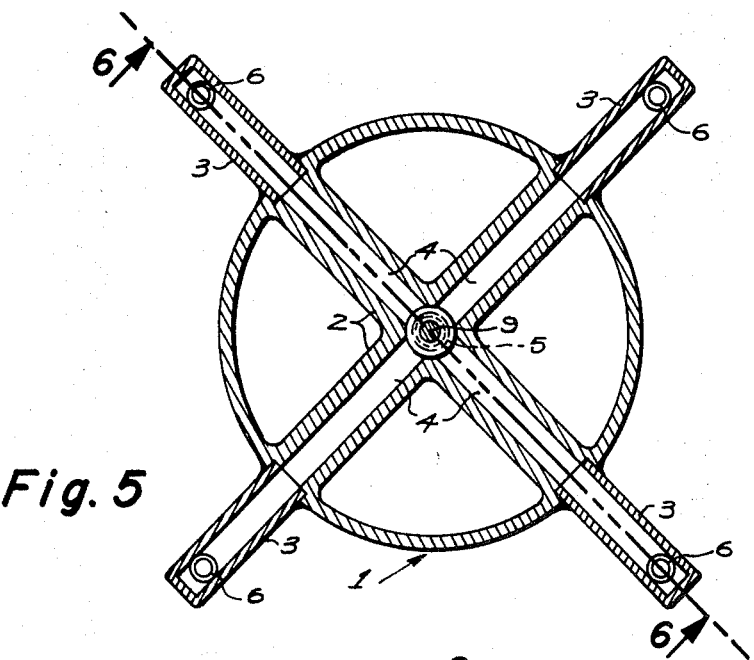
FIG. 5 is a sectional view, taken through 5—5 of FIG. 1, illustrating the level sensor.

The leveler for trailers includes a level sensor 1, which is fixed to the trailer in a position parallel with the floor so that when the level sensor indicates a level condition, the floor of the trailer is level. The level sensor includes a base plate 2, having radiating arms 3. The arms are tubular and closed at their extremities so as to form with the base plate a cross shaped chamber 4. At the center of the base plate there is provided a downwardly extending inlet member 5. At the extremity of each radiating arm 3 is an outlet member 6 which projects upwardly into the cross chamber 4. The lower extremity of the inlet member 5 and the upper extremities of the outlet members 6 define a common plane or approximately so.

Mounted on the base plate 2 is a reservoir 7, joined to the base plate by suitable seal means 8. A tie bolt 9 extends downwardly through the reservoir 7 and through the inlet member 5 for attachment to the base plate 2.

Suitably located in the trailer is a pump unit. For purposes of illustration, the pump unit is shown as located directly under the sensor; however, it may be located elsewhere as long as its location is below the level of the sensor. The pump unit includes a pump base 10, which includes a pump manifold 11, having suitable inlet and outlet passages, not shown, for a set of four upwardly directed pump cylinders 12. An inlet line 13 extends between each outlet member 6 and a corresponding pump cylinder. Adjacent the pump cylinder, each inlet line is provided with a check valve 14.

The outlet from each pump cylinder is joined to a T-shaped outlet fitting 15 through an outlet check valve 16. One branch of each outlet fitting 15 is joined to a hydraulic jack line 17, terminating at a hydraulic jack 18.

Each hydraulic jack 18 includes a cylinder 19, having a piston 20 joined to a shaft 21 which is extensible downward from the cylinder 19. The shaft terminates in a foot plate 22. Within the cylinder 19 is a return spring 23 capable of lifting the piston and shaft.

The other end of each outlet fitting 15 is provided with a return line 24 which leads to a manifold 25 common to all of the return lines. A check valve 26 for each return line is located adjacent the manifold 25. a Common return line 27 leads from the manifold to the upper portion of the reservoir 7. The return line 27 is provided with a back flow valve 28.

Extending upwardly between the group of pump cylinders 12 is a mounting post 29 which pivotally supports for movement about a common axis a pair of pump levers 30. Each pump lever overlies a pair of pump cylinders and at opposite sides of its pivotal axis is provided with connecting links 31, joined to pistons 32, fitting the pump cylinders 12. The pump levers 30 are provided with a common pump arm 33, indicated fragmentarily in FIG. 1, so that on operation of the pump arm, all four cylinders are operated simultaneously.

Operation of the leveler for trailers is as follows:

The hydraulic jacks 18 are, conventionally, located at the corners of the trailer and the level sensor is positioned so that an outlet corresponds in direction to each hydraulic jack. Ideally, the leveler would be located equidistant from all of the jacks. Practically, however, this is not satisfactory, as this would interfere with the equipment and passageways in the trailer. As a practical matter, it has been found that the level sensor may be located at virtually any convenient place; that is, at either side or forward or rearward in the trailer.

Also, preferably but not necessarily, the pump unit is located adjacent the level sensor. In practice, the pump unit is located, particularly if it is to be manually operated, at a place convenient for access to the common pump arm 33. If the pump arm is motor driven, then the location of the pump unit is less critical.

Figure 6:
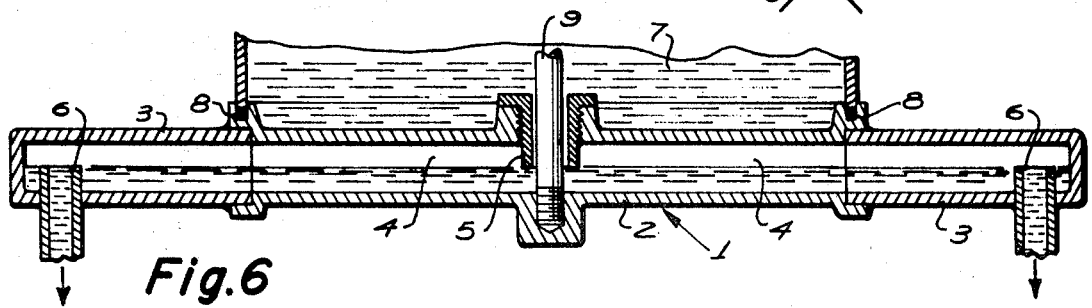
FIG. 6 is an enlarged fragmentary transverse sectional view, taken through 6—6 of FIG. 5, showing the level sensor in its level condition.
Figure 7:
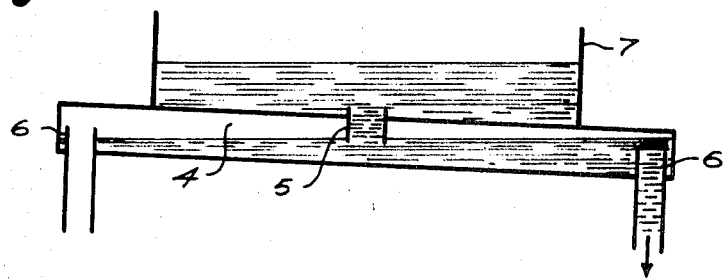
FIG. 7 is a diagrammatical view, similar to FIG. 6, showing the level sensor in an inclined position.

As in conventional practice, the jacks 18 are normally moved out of the way for travel. When a site is reached, the jacks are moved to their vertical position, whereupon the pumps are operated simultaneously. It will be observed from FIG. 7 that if the level sensor is tilted, the lowermost outlet or pair of outlets will receive the hydraulic fluid. Consequently, the corresponding pumps will deliver hydraulic fluid to their respective jacks. This has the effect of moving the trailer and the level sensor toward their horizontal position, shown in FIG. 6.

If the lower extremity of the inlet and the upper extremities of the four outlets define a precise common plane, the tendency is that none of the pumps will receive hydraulic fluid once the level sensor is in its level condition. If it is desired to effect vertical upward movement of the trailer when in its level condition, the lower end of the inlet may be slightly above the upper ends of the outlets. Also, depending upon the surface tension of the hydraulic fluid, slight departure from a true common plane is desirable.

When it is desired to retract the jacks, it is merely necessary to open the back flow valve 28 so that the hydraulic jack springs may force the hydraulic fluid back to the reservoir. After this is accomplished, the back flow valve is again closed. It will be noted that the check valves 26 permit flow from the return lines 24 to the manifold, but prevent flow from the manifold through the return lines. This is to prevent the active pump from delivering hydraulic fluid to an inactive pump.

While the leveler is particularly intended for trailers, it is equally useful for leveling other vehicles, or for that matter, stationary structures.

The present embodiment of this invention is to be considered in all respects as illustrative and not restrictive.

I claim:
1. The combination with a structure to be leveled and having a set of hydraulic leveling jacks, of a leveler, comprising:
   (a) a set of pumps operable in unison and connected individually to the jacks;
   (b) a rservoir common to the pumps;
   (c) and a level sensor fixed to the structure between the reservoir and the pumps, the level sensor having outlets to the pumps corresponding in position to the jacks and operatively connected thereto; said level sensor, when tilted, causing flow from the lowermost outlet, thereby to cause the corresponding pump to supply hydraulic fluid to its corresponding jack;
   (d) said level sensor defining a chamber having a downwardly directed inlet from the reservoir at its center, and the outlets in radial relation thereto, the outlets being upwardly directed and defining with the inlet a common plane.

2. The combination with a structure to be leveled, of a leveler comprising:
   (a) a set of leveling jacks adapted to be extended by hydraulic fluid supplied thereto and including retraction springs tending to return the hydraulic fluid therefrom;
   (b) a level sensor fixed to the structure and defining a chamber having a set of radiating portions orientated in correspondence with the jacks, upwardly open outlets in the radiating portions and a downwardly open inlet at its center; said inlet and outlets defining an essentially common plane representative of the level condition of the structure;
   (c) a reservoir for supplying a hydraulic fluid to the inlet;
   (d) a pump for receiving hydraulic fluid from each outlet for delivery to the correspondingly orientated jack;
   (e) means for operating the pumps in unison;
   (f) said level sensor chamber, when tilted, tending to supply hydraulic fluid to a lower outlet and shut off supply to an upper outlet, thereby to cause the level sensor and the structure to move from a tilted position toward a level position.

3. A leveler, as defined in claim 2, which further includes:
   (a) a return line common to the communications between the pumps and the jacks and extending to the reservoir;
   (b) and a valve in the return line whereby, on opening the valve, the springs in the jacks force the hydraulic fluid back to the reservoir.

4. A leveler, as defined in claim 2, wherein:
   (a) a manifold is connected to the outlets of the pumps;
   (b) check valves permit flow from the outlets to the manifold but prevent reverse flow;
   (c) a line connects the manifold to the reservoir;
   (d) and a shutoff valve is interposed in the line, whereby on opening the shutoff valve the springs in the jacks cause backflow of fluid to the reservoir.

References Cited

UNITED STATES PATENTS 3,289,868  12/1966  Miller _____ 254—45X

ROBERT C. RIORDON, Primary Examiner

D. R. MELTON, Assistant Examiner